US010208604B2

(12) United States Patent
Slavens et al.

(10) Patent No.: US 10,208,604 B2
(45) Date of Patent: Feb. 19, 2019

(54) COOLING FEATURES WITH THREE DIMENSIONAL CHEVRON GEOMETRY

(71) Applicant: United Technologies Corporation, Hartford, CT (US)

(72) Inventors: Thomas N. Slavens, Moodus, CT (US); Brooks E. Snyder, Dartmouth (CA)

(73) Assignee: United Technologies Corporation, Farmington, CT (US)

( * ) Notice: Subject to any disclaimer, the term of this patent is extended or adjusted under 35 U.S.C. 154(b) by 415 days.

(21) Appl. No.: 15/140,093

(22) Filed: Apr. 27, 2016

(65) Prior Publication Data
US 2017/0314398 A1 Nov. 2, 2017

(51) Int. Cl.
F01D 5/18 (2006.01)
B33Y 80/00 (2015.01)
B33Y 10/00 (2015.01)

(52) U.S. Cl.
CPC ............. F01D 5/186 (2013.01); F01D 5/187 (2013.01); B33Y 10/00 (2014.12); B33Y 80/00 (2014.12); F05D 2230/31 (2013.01); F05D 2250/314 (2013.01); F05D 2250/71 (2013.01); F05D 2250/72 (2013.01); F05D 2250/75 (2013.01); F05D 2260/202 (2013.01); F05D 2260/22141 (2013.01); F05D 2300/10 (2013.01)

(58) Field of Classification Search
CPC ......... F01D 5/186; F01D 5/187; B33Y 10/00; B33Y 80/00; F05D 2230/31; F05D 2250/314; F05D 2250/71; F05D 2250/72; F05D 2250/75; F05D 2260/202; F05D 2260/22141; F05D 2300/10
See application file for complete search history.

(56) References Cited

U.S. PATENT DOCUMENTS

| 4,297,077 A | 10/1981 | Durgen et al. |
| 4,514,144 A * | 4/1985 | Lee ........................... B22C 9/04 |
| | | 416/96 R |
| 5,395,212 A * | 3/1995 | Anzai ..................... F01D 5/187 |
| | | 415/115 |
| 5,681,144 A * | 10/1997 | Spring ................... F01D 5/187 |
| | | 415/115 |

(Continued)

FOREIGN PATENT DOCUMENTS

| EP | 0896127 B1 | 2/1999 |
| EP | 1849960 A2 | 10/2007 |
| WO | 2014175937 | 10/2014 |

OTHER PUBLICATIONS

European Patent Office, Partial European Search Report dated Jan. 26, 2018 in Application No. 17168311.3-1006.

Primary Examiner — Carlos A Rivera
Assistant Examiner — Eric J Zamora Alvarez
(74) Attorney, Agent, or Firm — Snell & Wilmer L.L.P.

(57) ABSTRACT

An internally cooled component of a gas turbine engine is provided. The component may include a cooling passage at least partially defined by a first wall and a second wall with a first pedestal extending from the first wall to the second wall. The first pedestal may have a chevron geometry. A second pedestal may extend from the first wall to the second wall and also have a chevron geometry. A gap may be defined by the first pedestal and the second pedestal with the gap oriented between the first pedestal and the second pedestal.

15 Claims, 10 Drawing Sheets

(56) References Cited

U.S. PATENT DOCUMENTS

| | | | | |
|---|---|---|---|---|
| 5,695,321 A * | 12/1997 | Kercher | F01D 5/187; 415/115 |
| 5,797,726 A * | 8/1998 | Lee | F01D 5/187; 416/96 R |
| 6,331,098 B1 * | 12/2001 | Lee | F01D 5/187; 416/97 R |
| 6,554,571 B1 * | 4/2003 | Lee | F01D 5/187; 416/92 |
| 6,929,058 B2 * | 8/2005 | Liu | F28F 3/12; 165/104.33 |
| 7,347,671 B2 * | 3/2008 | Dorling | F01D 5/187; 416/97 R |
| 8,292,578 B2 * | 10/2012 | Horiuchi | F01D 5/187; 416/1 |
| 8,690,538 B2 * | 4/2014 | Levine | F01D 5/187; 415/115 |
| 2006/0016582 A1 * | 1/2006 | Hashimoto | F28D 7/1684; 165/109.1 |
| 2008/0019840 A1 | 1/2008 | Cunha | |
| 2010/0205972 A1 * | 8/2010 | Chila | F23R 3/002; 60/752 |
| 2013/0055722 A1 | 3/2013 | Verhiel et al. | |
| 2013/0236330 A1 * | 9/2013 | Lee | F01D 5/182; 416/97 R |
| 2013/0243591 A1 * | 9/2013 | Propheter-Hinckley | F01D 5/187; 416/1 |
| 2015/0377029 A1 * | 12/2015 | Blake | F01D 5/187; 416/232 |

* cited by examiner

COOLING FEATURES WITH THREE DIMENSIONAL CHEVRON GEOMETRY

FIELD

The disclosure relates generally to gas turbine engines, and more particularly to cooling features having chevron geometries.

BACKGROUND

In the pursuit of ever higher efficiencies, gas turbine manufacturers have long relied on higher and higher turbine inlet temperatures to provide boosts to overall engine performance. In typical modern engine applications, the gas path temperatures within the turbine exceed the melting point of the component constituent materials. To combat the demanding temperatures, dedicated cooling air may be extracted from the compressor and used to cool the gas path components, incurring significant cycle penalties. Cooled components may include, for example, rotating blades and stator vanes in the turbine.

One mechanism used to cool turbine airfoils includes utilizing internal cooling circuits and/or a baffle. Typically, numerous film cooling holes and high volumes of cooling fluid are required to provide the needed airfoil cooling. To augment the internal cooling, a number of interior treatments to the passages have been implemented including pedestals, air jet impingement, and turbulator treatments for the walls.

A limitation in the use of pins and pedestals in internal cavities is a manufacturing limitation. Namely, internal features may be kept in a normal direction toward the pull-plane of the casting dies typically used to generate cooled components. In the case of pedestals in stamped metallic cores, this means that the pedestals may be normal to the cavity flow direction commensurate with the action of pressing the core.

SUMMARY

An internally cooled component of a gas turbine engine is provided. The component may include a cooling passage at least partially defined by a first wall and a second wall with a first pedestal extending from the first wall to the second wall. The first pedestal may have a chevron geometry. A second pedestal may extend from the first wall to the second wall and also have a chevron geometry. A gap may be defined by the first pedestal and the second pedestal with the gap oriented between the first pedestal and the second pedestal.

In various embodiments, the first pedestal may include a base disposed at the first wall and a first flat segment extending from the base. An angled segment may extend from the first flat segment, and a second flat segment may extend from the angled segment. The first flat segment may be oriented at an angle ranging from 5 degrees to 25 degrees relative to a line normal to a flow path. The first pedestal may be oriented at an angle ranging from 176 degrees to 140 degrees relative to the second pedestal. The first flat segment may also be oriented at an angle ranging from 176 degrees to 120 degrees relative to the second flat segment. A hydraulic diameter of the cooling passage divided by a characteristic length of both the first pedestal and the second pedestal may be less than 1.5. The first pedestal and the second pedestal may be configured to generate a vortex in response to a fluid flowing through the gap. The internally cooled component may also include a third pedestal extending from the first wall to the second wall and aligned with the first pedestal in a direction of fluid flow, and a fourth pedestal extending from the first wall to the second wall and also aligned with the second pedestal in the direction of fluid flow.

An airfoil is also provided. The airfoil may comprise an internal cooling passage with a serpentine geometry that defines a fluid flow direction. A first cooling feature may be formed in the internal cooling passage. The first cooling feature may include a first pedestal having a chevron geometry and a second pedestal also having a chevron geometry. A second cooling feature may be formed in the internal cooling passage and aligned with the first cooling feature in the fluid flow direction.

In various embodiments, the first pedestal may comprise a base disposed at a first wall of the internal cooling passage, a first flat segment extending from the base, an angled segment extending from the first flat segment, and a second flat segment extending from the angled segment to a second wall of the internal cooling passage. The first flat segment may be oriented at an angle ranging from 5 degrees to 25 degrees relative to a line normal to a flow path. The first pedestal is may be at an angle ranging from 176 degrees to 140 degrees relative to the second pedestal. The first flat segment may also be oriented at an angle ranging from 176 degrees to 120 degrees relative to the second flat segment. A hydraulic diameter of the internal cooling passage divided by a characteristic length of both the first pedestal and the second pedestal may be less than 1.5. The first pedestal and the second pedestal may be configured to generate a vortex in response to a fluid flowing through a gap disposed between the first pedestal and the second pedestal. The first pedestal and the internal cooling passage may be configured to generate a vortex in response to a fluid flowing through an outer region defined by the internal cooling passage and the first pedestal. The first pedestal and the second pedestal may be canted towards an interior portion of the internal cooling passage to form a third chevron geometry.

A cast core is also provided. The cast core may include a cooling passage at least partially defined by a first wall and a second wall. A first pedestal may extend from the first wall to the second wall and have a chevron geometry. A second pedestal may also extend from the first wall to the second wall and have a chevron geometry. A gap may be defined by the first pedestal and the second pedestal with the gap oriented between the first pedestal and the second pedestal. The first pedestal may be canted relative to the second pedestal to form another chevron geometry.

In various embodiments, the first pedestal may include a base disposed at the first wall, and a first flat segment that extends from the base. The first flat segment may be oriented at an angle ranging from 5 degrees to 25 degrees relative to a line normal to the a flow path. An angled segment may extend from the first flat segment, and a second flat segment may extend from the angled segment. The first pedestal may be oriented at an angle ranging from 176 degrees to 140 degrees relative to the second pedestal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure leverages the emergent technology of additive manufacturing to create a pedestal flow turbulator with non-linear profiles. The advancement of additive manufacturing to create metal parts enables for extremely detailed, intricate, and adaptive feature designs. The ability to utilize this technology not only increases the design space of the parts but allows for a much higher degree of manufacturing robustness and adaptability. It enables the elimination of costly manufacturing tooling and allows for the 3D definition of the part to be made to be the only tooling needed for storage. Additive metal manufacturing typically utilizes lasers or electron beams to sinter particles in a 2D powder bed. Parts are typically made by successively sintering layers up to from the component.

Various embodiments of the present disclosure utilize a 3D swept turbulator to augment heat transfer inside of large through-flow cavities. Winglet augmentation may generate vertical structures that shed disrupting the boundary layer and increasing the heat transfer rate from the coolant to the blade surfaces.

Figure 1:
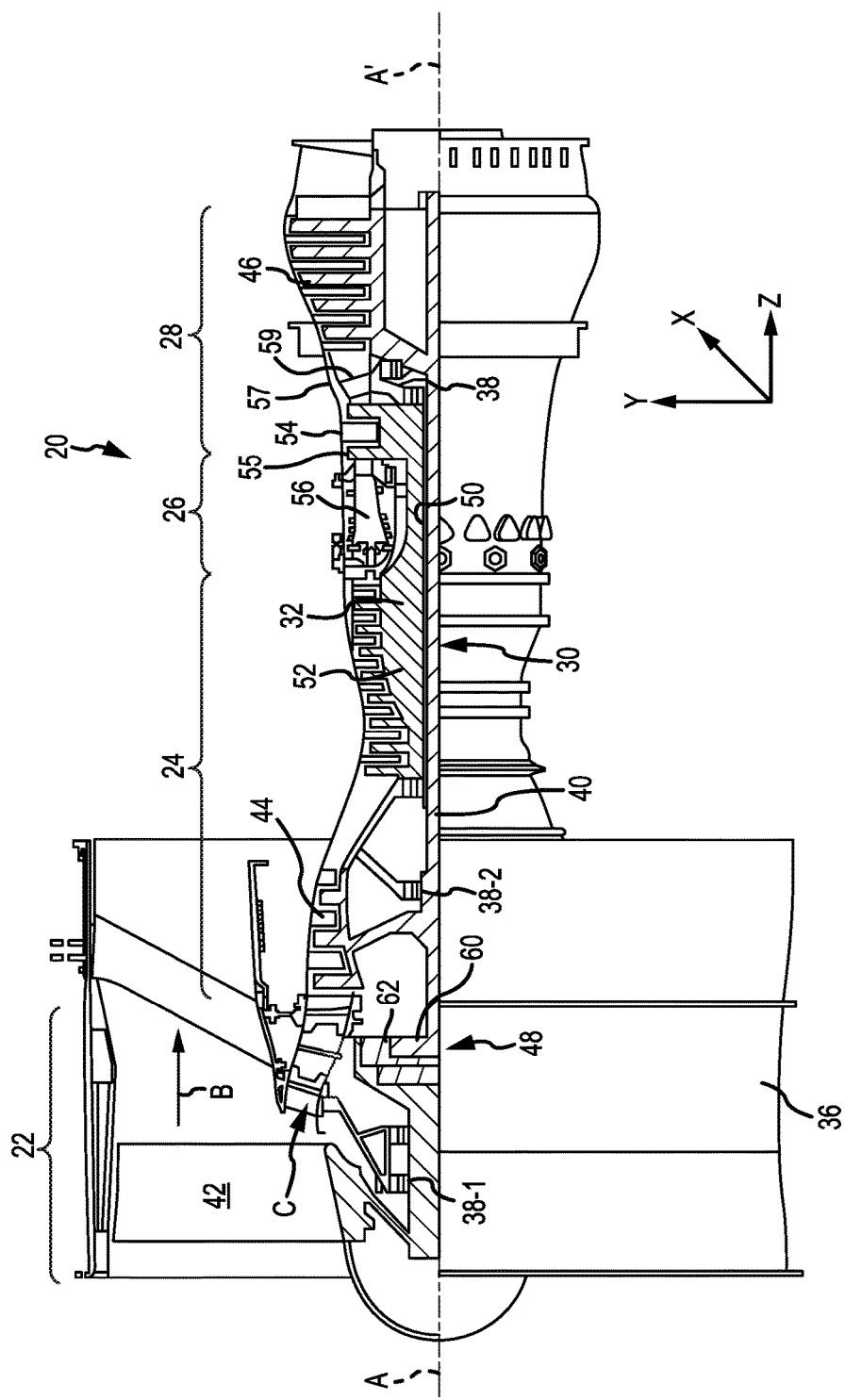
FIG. 1 illustrates an exemplary gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass-flow path B while compressor section 24 can drive coolant along a core-flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'.

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Airfoil 55 may be an internally cooled component of gas turbine engine 20. Trip strips may be located in internal cooling cavities of internally cooled engine parts, as detailed further below. Internally cooled engine parts may be discussed in the present disclosure in terms of airfoils. However, the present disclosure applies to any internally cooled engine component (e.g., blade outer air seals, airfoil platforms, combustor liners, blades, vanes, or any other internally cooled component in a gas turbine engine).

Figure 2:
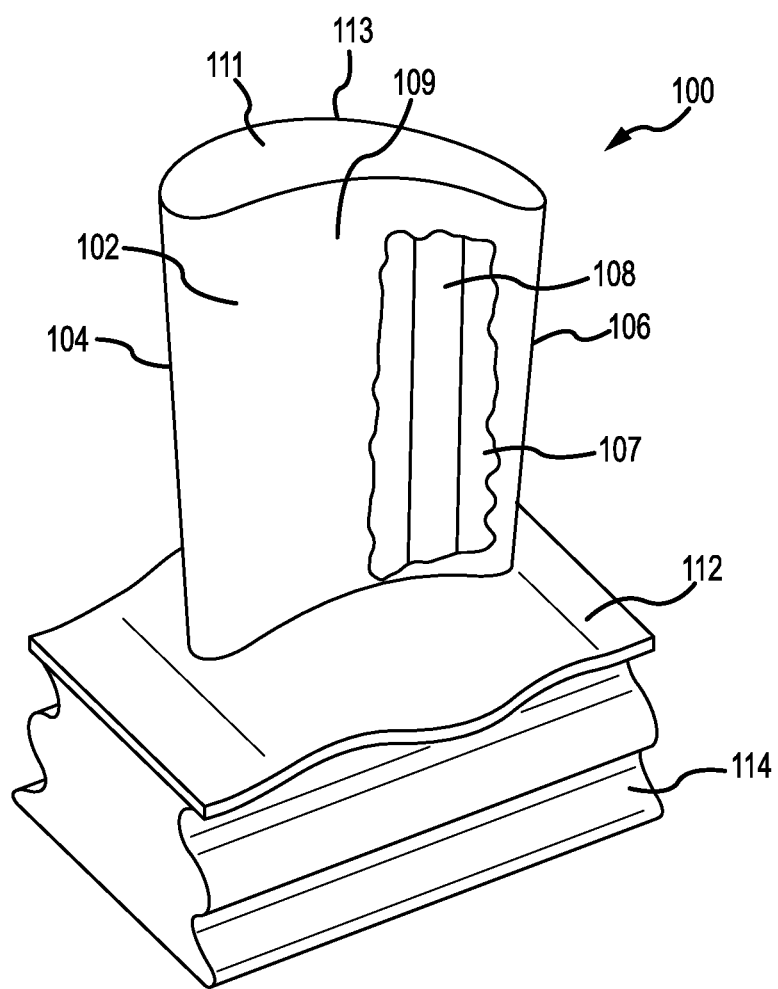
FIG. 2 illustrates an exemplary air foil having an internal cooling passage, in accordance with various embodiments.

With reference to FIG. 2, an airfoil 100 is shown with cooling passage 108, in accordance with various embodiments. Although an airfoil is shown, the present disclosure applies to any internally cooled part (e.g., blade outer air seals, airfoil platforms, combustor components, etc.). Airfoil 100 has a pressure side 102, a leading edge 104, and a trailing edge 106. Airfoil 100 also includes top 111 and suction side 113. Pressure side 102 surface is partially cutaway to illustrate cooling passages 108 defined be internal walls of airfoil 100. Hot air flowing through a gas turbine engine may first contact leading edge 104, flow along pressure side 109 and/or suction side 113, and leave airfoil at trailing edge 106.

In various embodiments, material 107 may define internal passages such as cooling passage 108. Cooling passage 108 is oriented generally in a direction from platform 112 and attachment 114 towards top 111 (i.e., a radial direction when airfoil 100 is installed in a turbine). Airfoil 100 may contain multiple cooling passages or chambers similar to cooling passage 108 oriented in various directions with varying hydraulic diameters. The internal cooling passages may be interconnected. Multiple cooling features may appear in the internal cooling passages, as illustrated in further detail below.

Figure 3:
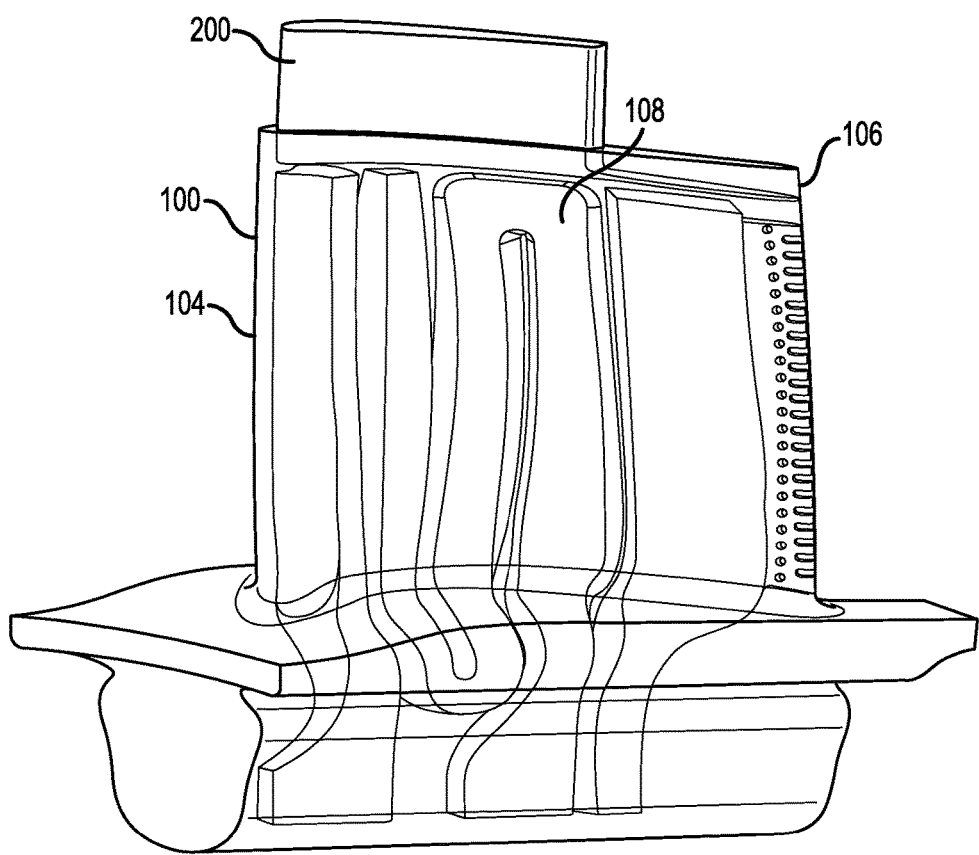
FIG. 3 illustrates a cast core for casting an airfoil, in accordance with various embodiments.

With reference to FIG. 3, a cast core 200 is shown, in accordance with various embodiments. Cast core 200 may be used in casting airfoil 100 to define internal features. Cast core 200 may define features aft of leading edge 104 and up to trailing edge 106 in airfoil 100. Cast core 200 may extend beyond trailing edge 106 of airfoil 100 during the casting process to define aft cooling openings. Cast core 200 may define cooling passage 108 of airfoil 100. In that regard, both airfoil 100 and cast core 200 may have the cooling passages and cooling features described herein.

The cast core 200 has a negative of the cooling features described below. In that regard, the cooling features and pedestals may be formed as passages through cast core 200. Cast core 200 may then be placed in a mold, and the material to form the component (e.g., airfoil 100) may be deposited in the mold. Cast core 200 may be removed from the component, leaving a cavity with the desired cooling features. Airfoil 100 (as well as other components using fluid turbulation) may be made from an austenitic nickel-chromium-based alloy such as that sold under the trademark Inconel® which is available from Special Metals Corporation of New Hartford, N.Y., USA, or other materials capable of withstanding exhaust temperatures.

In various embodiments, FIGS. 4-7C illustrate potential cooling feature configurations that may be formed on a ceramic core or on a component such as airfoil 100. When formed on a ceramic core, the cooling features may appear as indentations and/or passages. When formed on a component (e.g., airfoil 100), the cooling feature configurations may protrude from and/or across an internal passage.

Figure 4:
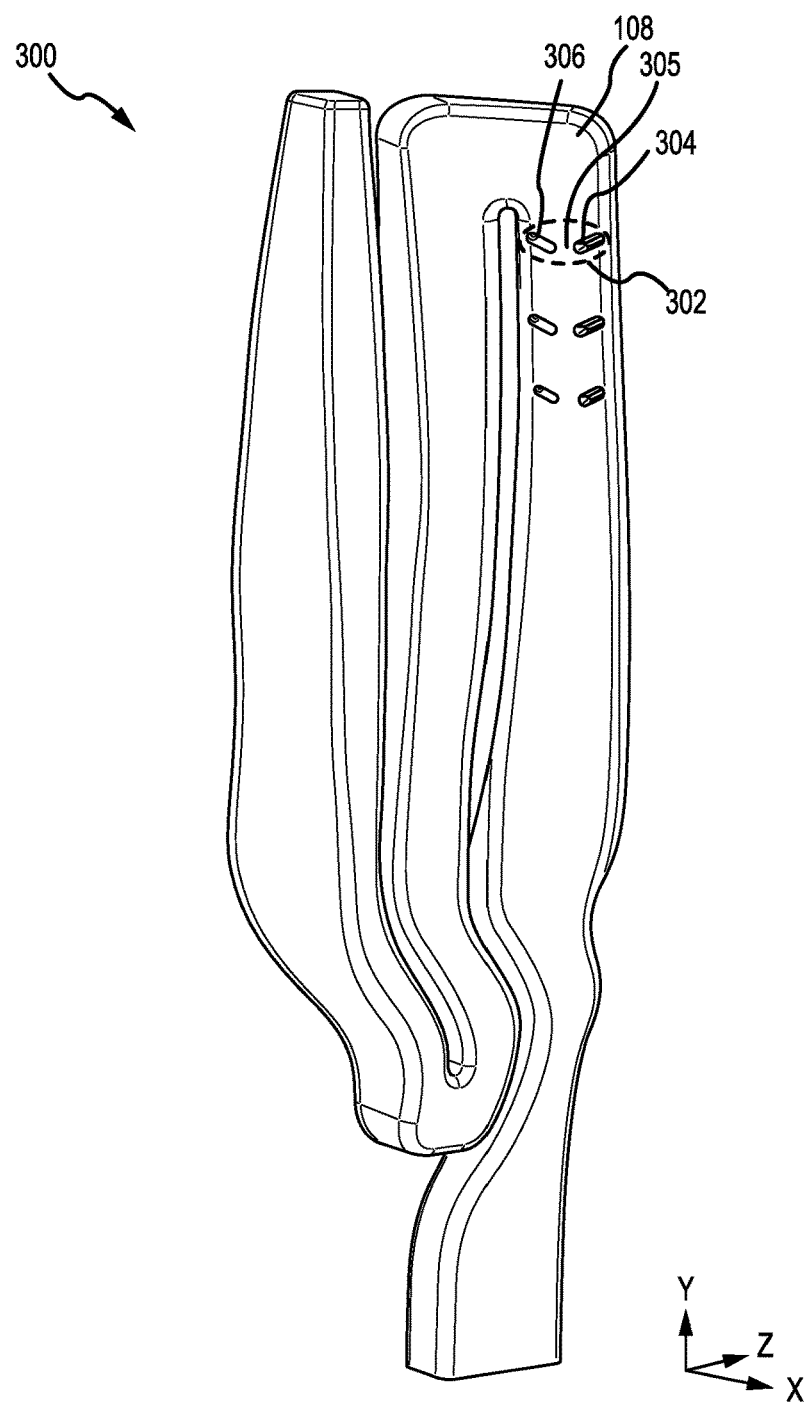
FIG. 4 illustrates a cooling passage having cooling features with a 3D chevron geometry, in accordance with various embodiments.

With reference to FIG. 4, an internal cooling system 300 is shown with cooling passage 108 having a serpentine geometry and including discrete cross-channel winglet pedestals (pedestal 304 and pedestal 306), in accordance with various embodiments. The illustrations and descriptions of cooling passage 108 in FIGS. 4 through 7C may describe an internal cooling passage 108 of a cooled component such as airfoil 100 and/or an internal cooling passage as defined by a cast core 200 used to create flow turbulation features.

Cooling passage 108 may include one or more pairs of pedestal 304 and pedestal 306 forming a cooling feature 302 having a 3D chevron geometry. Although pedestal 304 and pedestal 306 are illustrated in pairs, the pedestals may also be configured in a singlet or individual pedestal configuration. Similarly, the pedestals may also be configured in a staggered configuration with pedestals staggered in a flow direction. Pedestal 304 and pedestal 306 may extend across cooling passage 108 in the z-direction (i.e., into and out the page as illustrated in FIG. 4). In that regard, pedestal 304 and pedestal 306 may partially obstruct cooling passage 108. Multiple cooling features 302 may be aligned along cooling passage 108 in the flow direction y direction to form a series of cooling features 302. In that regard, pedestals may be aligned in a flow direction (i.e., the y direction).

In various embodiments, gap 305 may be defined by, and disposed between, pedestal 304 and pedestal 306 at a location where pedestal 304 and pedestal 306 are angled relative to one another and relative to the x-axis, as described in greater detail below. As illustrated, pedestal 304 and pedestal 306 are aligned in a direction normal to the fluid flow path (in the x-direction in the location of cooling feature 302 as illustrated in FIG. 4). Fluid may flow through gap 305 in the direction of fluid flow path (in the y-direction in the location of cooling feature 302 as illustrated in FIG. 4). Fluid may also flow around pedestal 304 and pedestal 306 along cooling passage 108. Pedestals 304 and 306 are constructed of a geometry without a natural single longitudinal direction of inspection.

Figure 5A:
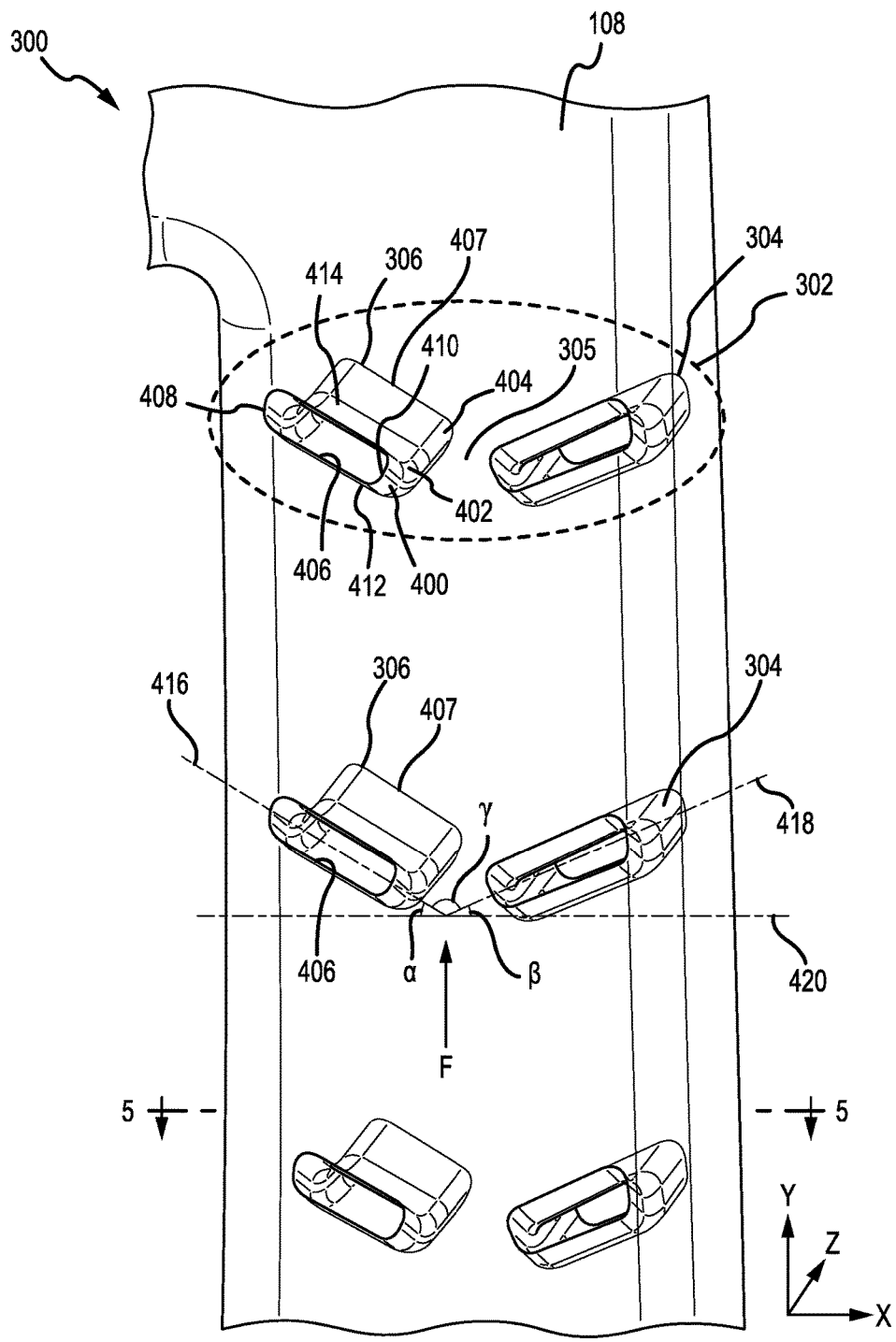
FIG. 5A illustrates a series of cooling features having a 3D chevron geometry in a series, in accordance with various embodiments.

Referring now to FIG. 5A, internal cooling system 300 is shown in the area of cooling feature 302, in accordance with various embodiments. Cooling passage 108 may have multiple cooling features 302 including a pedestal 304 and a pedestal 306. Each pedestal 304 and/or pedestal 306 may include base 406 where the pedestal 306 meets the wall of cooling passage 108.

Figure 5B:
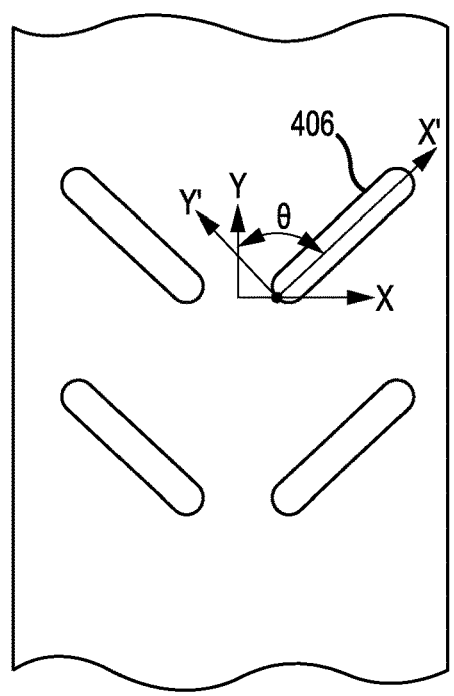
FIG. 5B illustrates a chevron geometry of a cooling feature across multiple pedestals, in accordance with various embodiments.
Figure 5C:
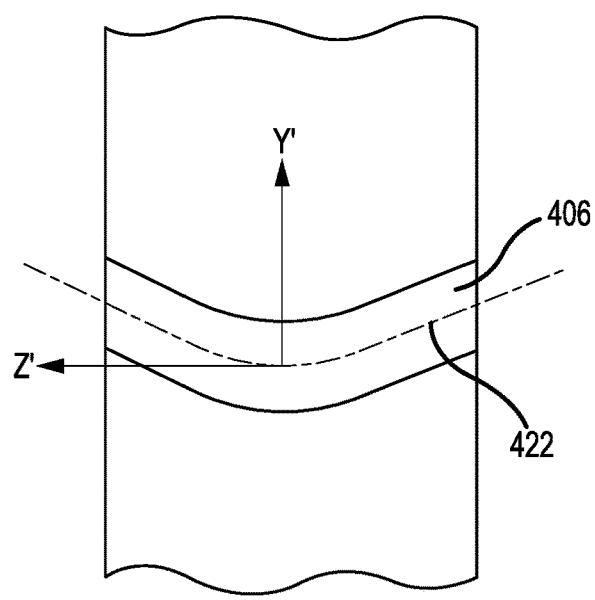
FIG. 5C illustrates a chevron geometry of a cooling feature across a single pedestal, in accordance with various embodiments.

With brief reference to FIGS. 5B and 5C, pedestal 306 and pedestal 304 have a two-dimensional profile 422 that is swept into the oncoming flow (in the y direction). A projected view of the base 406 on the sidewall of cavity 108 is shown in FIG. 5B. The base profile 422 (of FIG. 5C) is oblong with a primary longitudinal direction possessing an angle θ away from the direction of the main direction of the cavity y. This rotation creates a second coordinate system x', y', z' that is aligned with the primary longitudinal direction of profile 422. Profile 422 is then extruded along a variable profile defined in the y'-z' plane. This extrusion is shown in FIG. 5C and creates the pedestals 304 and/or 306. The extrusion may intersect the wall opposite of 406 to create base 407 within cooling passage 108.

Returning to FIG. 5A, flat segment 400 may extend from base 406 to curved segment 402. Flat segment 400 may be a radial segment that has a greater radius than curved segment 402. In that regard, flat segment 400 may be flat relative to curved segment 402. Curved segment 402 may extend to a flat segment 404. Flat segment may also be a radial segment that has a greater radius than curved segment 402. Flat segment 404 may extend to another base 407 of pedestal 306 along a wall of cooling passage 108.

An upstream surface 412 may be oriented to contact fluid F flowing in the y-direction prior to downstream surface 414. Sidewall 410 of pedestal 306 that at least partially defines gap 305 may extend between upstream surface 412 and downstream surface 414.

In various embodiments, pedestal 304 and pedestal 306 may be oriented at angles relative to the x-axis. Pedestal 306 may be oriented in the direction of line 416 relative to base 406, flat segment 400, flat segment 404, and/or base 407. Line 416 may be parallel to one or more surfaces of the aforementioned portions of pedestal 306. Line 416 may also be defined by an average position of the aforementioned portions of pedestal 306 in the x-y plane. In that regard, angle α represents the angle of pedestal 306 relative to line 420 normal to the flow path (as illustrated, the flow path of fluid F is in the y direction, and the direction normal to the flow path is the x direction). Angle α between pedestal 306 and line 420 normal to the flow path may range from 2° to 20°, from 5°-15°, or from 7°-12°, for example.

Pedestal 304 may be oriented in the direction of line 418 relative to base 406, flat segment 400, flat segment 404, and/or base 407 of pedestal 304. Line 418 may be parallel to one or more surfaces of the aforementioned portions of pedestal 304. Line 418 may also be defined by an average position of the aforementioned portions of pedestal 304 in the x-y plane. In that regard, angle β represents the angle of pedestal 304 relative to line 420 normal to the flow path (as illustrated, the flow path of fluid F is in the y direction, and the direction normal to the flow path is the x direction). Angle β between pedestal 304 and line 420 normal to the flow path may range from 2° to 20°, from 5°-15°, or from 7°-12°, for example.

In various embodiments, angle α and angle β may be varied or may be similar. The angle γ between pedestal 304 and pedestal 306 (and line 416 and line 318) may be equal to 180°−α−β. Angle γ may thus range from 176° to 140° depending on angle α and angle β. The aforementioned angles may be selected based on CFD analysis to achieve desired flow characteristics of fluid F. As a result of the above described angles, pedestal 306 and pedestal 304 may be canted towards the interior (i.e., in the direction of gap 305 from the pedestals) of cooling passage 108.

The V-shape formed by pedestal 304 and pedestal 306 (and line 416 and line 418) may also be referred to herein as a chevron geometry. Thus, cooling feature 302 comprising pedestal 304 and pedestal 306 have a chevron geometry (i.e., V shape) in the x-y plane. Pedestal 306 and pedestal 304 may each also have a second chevron geometry (i.e., V shape) in the y-z plane, as illustrated in greater detail in FIG. 7B below. In that regard, cooling feature 302 may include a chevron geometry in the x-y plane and a chevron geometry in the y-z plane. The characteristic of having chevron geometry in two planes perpendicular planes may be referred to as a 3D chevron geometry.

Figure 6:
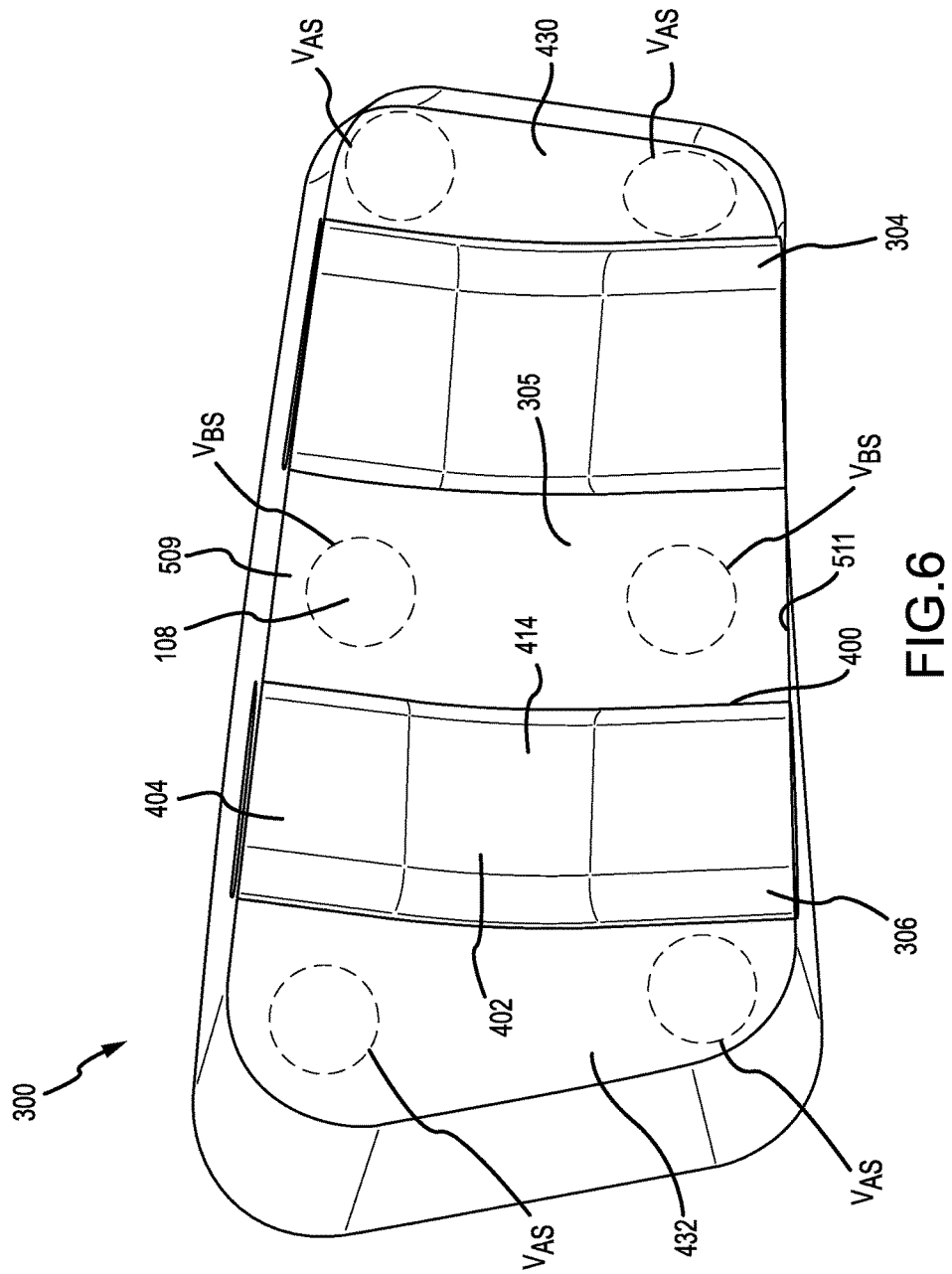
FIG. 6 illustrates a cross sectional view of an internal cooling passage with cooling features having 3D chevron geometry, in accordance with various embodiments.

In various embodiments, FIG. 6 illustrates a cross sectional view of cooling passage 108 in internal cooling system 300 as taken along line 5 in FIG. 5A, in accordance with various embodiments. Cooling passage 108 may be at least partially defined by wall 509 and wall 511. Cooling passage 108 may have a substantially quadrilateral geometry with wall 509 and wall 511 each defining one of four sides joined by curved sections. Cooling passage 108 may also have tubular and/or other polygonal geometries.

In various embodiments, pedestal 304 and pedestal 306 may extend from wall 509 to wall 511 and thus span a section of cooling passage 108. Downstream surface 414 defines the upstream wall of flat segment 400, curved segment 402, and flat segment 404. The flow F from FIG. 5A is oriented to flow out the page in FIG. 6. Vortices and other flow characteristics may be created as flow F flows through cooling passage 108 and interacts with pedestal 304 and pedestal 306.

In various embodiments, pedestal 304 and pedestal 306 may have an into-the-flow bend at curved segment 402. Stated another way, curved segment 402 may be oriented closer to flow F from FIG. 5A than (i.e., further into the page as illustrated in FIG. 6 than) flat segment 400 and flat segment 404. Pedestal 306 and/or pedestal 304 may thus have a V-shaped and/or chevron shaped profile. Thus, cooling features 302 may incorporate multiple chevron shapes (the chevron shape comprising pedestal 304 and pedestal 306, the chevron shape of the profile of pedestal 304, and the chevron shape of the profile of pedestal 306).

The geometry and orientation of pedestal 304 and pedestal 306 in cooling passage 108 may produce aero shed vortices $V_{AS}$. A shed vortex is a circulating flow generated in response to a fluid flowing past a bluff body at various velocities. In that regard, the flow F (as illustrated in FIG. 5A) flowing past pedestal 306 and pedestal 304 may generate aero shed vortices $V_{AS}$ in outer region 432 of cooling passage 108 partially defined by pedestal 306 and outer region 430 of cooling passage 108 partially defined by pedestal 304.

The geometry and orientation of pedestal 304 and pedestal 306 in cooling passage 108 may also generate blunt-body separation vortices $V_{BS}$ in response to flow F passing through gap 305 and separating from pedestal 304 and pedestal 306. The vortices may improve heat transfer characteristics and cooling of internal cooling system 300.

Figure 7A:
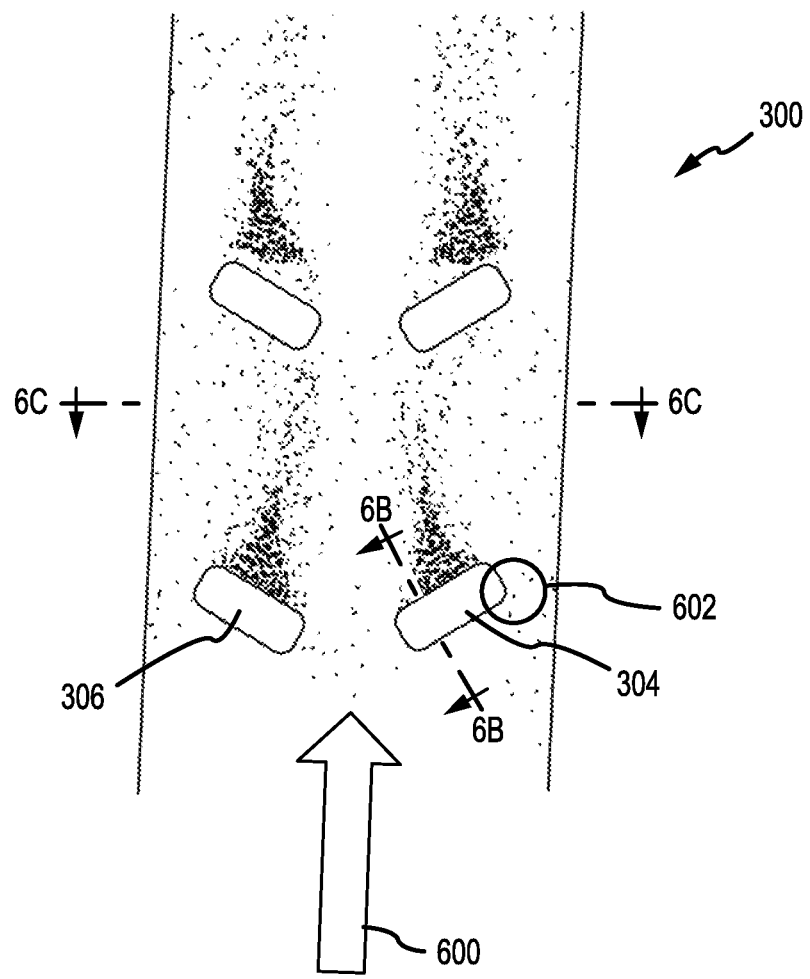
FIG. 7A illustrates a computational fluid dynamics (CFD) model of the flow in an internal cooling passage with cooling features having a 3D chevron geometry, in accordance with various embodiments.
Figure 7B:
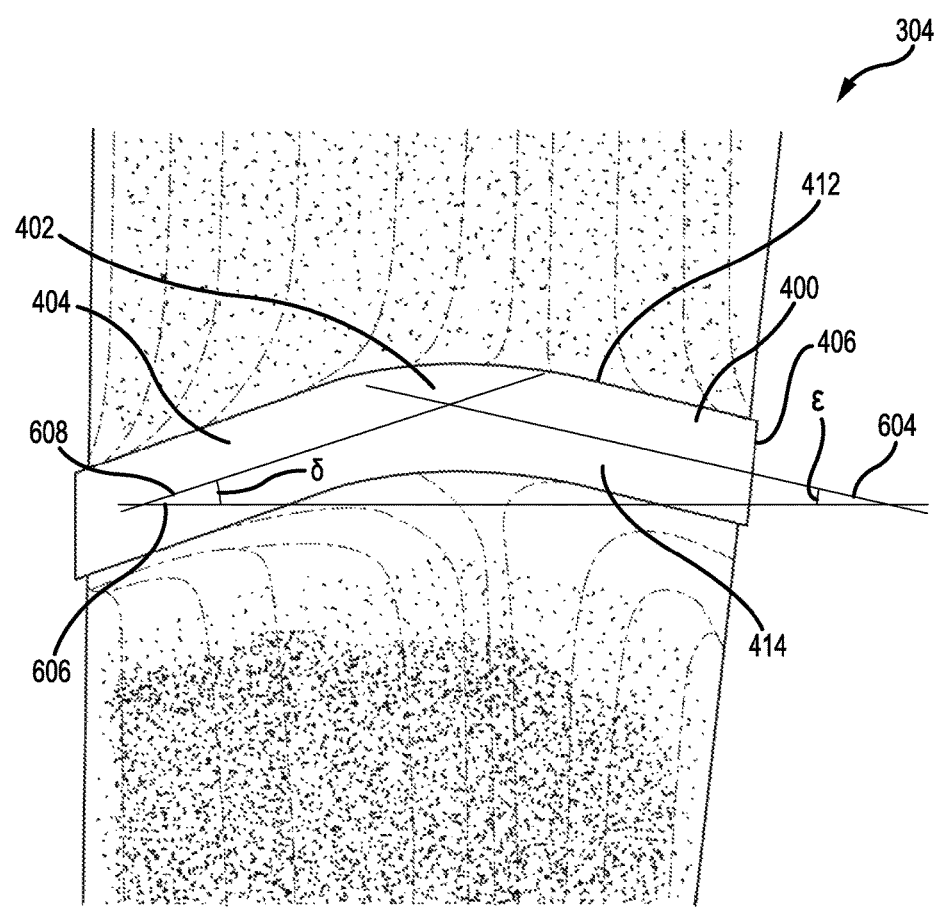
FIG. 7B illustrates a CFD model of the flow about a cross section of a cooling feature having a 3D chevron geometry, in accordance with various embodiments.
Figure 7C:
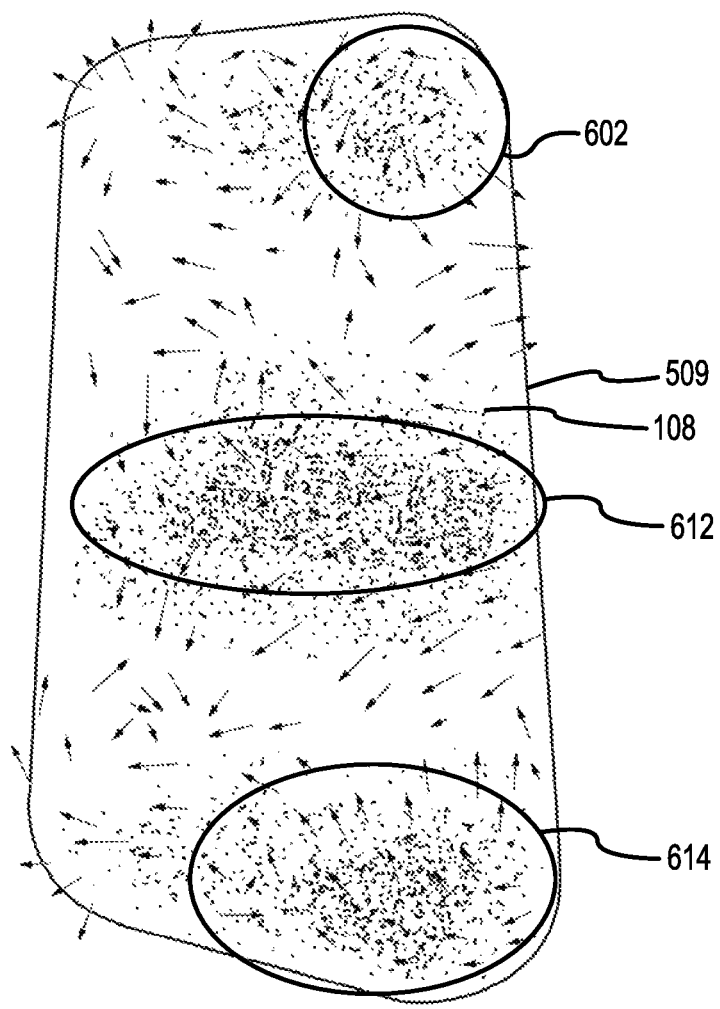
FIG. 7C illustrates a CFD model of the flow through a cross section of an internal cooling passage downstream from cooling features having a 3D chevron geometry, in accordance with various embodiments.

Referring now to FIGS. 7A to 7C, CFD analysis is shown for internal cooling system 300, in accordance with various embodiments. Flow is generally in direction 600 with varying directions and velocities, with fluid speed indicated by the density of dots, with greater density representing higher speeds. FIG. 7B is illustrative of the fluid flow as viewed from cross section 7B in FIG. 7A. FIG. 7C is illustrative of the fluid flow as viewed from cross section 7C in FIG. 7A. The various directions of fluid flow are illustrated in FIG. 7C by arrows.

Vortex 602 of FIG. 7A may form in response to the flow past pedestal 304. Vortex 602 may correspond to a vortex $V_{AS}$ (as illustrated in FIG. 6) formed in response to flow shedding from the oblique faces of pedestal 306 and/or pedestal 304 (i.e., upstream surface 412 as shown in FIG. 7B) as the fluid turns to the outside portion of the cooling passage 108. Secondary turbulation is caused by blunt-body separation behind the interior of pedestal 304 (i.e., adjacent downstream surface 414 as shown in FIG. 7B) in the center of the cooling passage 108. This blunt-body separation turbulation may tend to mix cool air from the center of cooling passage 108 towards the walls of cooling passage 108, where heat transfer may occur.

Referring now to FIG. 7B, a profile of pedestal 304 having a chevron and/or V-shaped geometry, as viewed from cross section 7B of FIG. 7A. Pedestal 306 may have a similar chevron and/or V-shaped geometry. Pedestal 304 may include flat segment 400 that is oriented substantially parallel to line 604 and flat segment 404 that is substantially parallel to line 606. Substantially parallel may mean that the portion of downstream surface 414 and/or the portion of upstream surface 412 defining flat segment 404 is parallel to line 606. Substantially parallel may also mean that the portion of downstream surface 414 and/or the portion of upstream surface 412 defining flat segment 400 is parallel to line 604. Substantially parallel may further mean that flat segment 400 is generally oriented in the direction of line 604 and that flat segment 404 is generally oriented in the direction of line 606. In that regard, line 604 and line 606 may be used to describe the orientation of the surfaces pedestals in cooling passage 108.

In various embodiments, flat segment 404 and flat segment 400 may be oriented at angles relative to line 608 normal to the flow of fluid F (of FIG. 5A) through cooling passage 108. Flat segment 404 may be oriented at angle δ relative to line 608, and flat segment 400 may be oriented at angle ε relative to line 608. Angle δ may range from 2°-30°, from 5°-25°, or from 10°-20°, for example. Angle ε may range from 2°-30°, from 5°-25°, or from 10°-20°, for example. Thus, flat segment 400 may be oriented at an angle ranging from 176°-120° relative to flat segment 404. Pedestal 304 may have a chevron geometry as illustrated by the chevron shape (i.e., V shape) formed by line 604 and line 608. Pedestal 306 may have a similar geometry. The angles of pedestals as described in FIGS. 7B and 4 may tend to generate cooling flow as depicted in FIGS. 6 and 7C.

Referring now to FIG. 7C, a CFD analysis of the flow in cooling passage 108 is shown as viewed from cross section 7C, in accordance with various embodiments. Vortex 602 may form in outer region 430 of cooling passage 108 and vortex 614 may form in outer region 432 of cooling passage 108. In that regard, the vortex 614 and vortex 602 may correspond to vortices $V_{AS}$ of FIG. 6. Vortex 612 may form as a result of flow passing through gap 305 (of FIG. 6) and may correspond to vortices $V_{BS}$ of FIG. 6.

In various embodiments, the dimensions of cooling passage 108, pedestal 304, and pedestal 306 may be selected to provide a predetermined blockage of the flow. For example, the dimensions of cooling passage 108 and the pedestals may be selected so that the hydraulic diameter of cooling passage 108 (i.e., 4 times the cross-sectional area of cooling passage 108 divided by the wetted perimeter of cooling passage 108) divided by the characteristic length (i.e., the square root of the area) of the pedestals is less than 3, less than 2, or 1.5, for example. The above calculations may be made using a cross sectional region perpendicular to the fluid flow path as illustrated in FIG. 6.

The cooling features of the present disclosure allows for fewer features in a core and/or airfoil through highly effective cooling flow turbulation. Utilized as the initial feature of a circuit, the 3D chevron features tend to increase the overall turbulent intensity of the cooling channel and augment the effectiveness of downstream heat transfer promoters.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment, for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cooled component of a gas turbine engine, comprising:
- a cooling passage at least partially defined by a first wall and a second wall;
- a first pedestal extending from the first wall to the second wall, the first pedestal comprising a first chevron geometry; and
- a second pedestal extending from the first wall to the second wall, the second pedestal comprising a second chevron geometry, wherein a gap is defined by the first pedestal and the second pedestal with the gap oriented between the first pedestal and the second pedestal, wherein the first pedestal is oriented at an angle ranging from 140 degrees to 176 degrees relative to the second pedestal, and wherein the first pedestal comprises:
- a base disposed at the first wall of the cooling passage;
- a first flat segment extending from the base;
- a curved segment extending from the first flat segment; and
- a second flat segment extending from the curved segment.

2. The cooled component of claim 1, wherein the first flat segment is oriented at an angle ranging from 5 degrees to 25 degrees relative to a line normal to a flow path.

3. The cooled component of claim 1, wherein the first flat segment is oriented at an angle ranging from 120 degrees to 176 degrees relative to the second flat segment.

4. The cooled component of claim 1, wherein a hydraulic diameter of the cooling passage divided by a characteristic length of both the first pedestal and the second pedestal is less than 1.5.

5. The cooled component of claim 1, wherein the first pedestal and the second pedestal are configured to generate a vortex in response to a fluid flowing through the gap.

6. An airfoil, comprising:
- an internal cooling passage; and
- a cooling feature formed in the internal cooling passage, the first cooling feature comprising:
  - a first pedestal having a first chevron geometry, and
  - a second pedestal having a second chevron geometry,
  wherein the first pedestal is oriented at an angle ranging from 140 degrees to 176 degrees relative to the second pedestal and comprises:
  - a base disposed at a wall of the internal cooling passage;
  - a first flat segment extending from the base;
  - a curved segment extending from the first flat segment; and
  - a second flat segment extending from the curved segment.

7. The airfoil of claim 6, wherein the first flat segment is oriented at an angle ranging from 5 degrees to 25 degrees relative to a line normal to a flow path.

8. The airfoil of claim 6, wherein the first flat segment is oriented at an angle ranging from 120 degrees to 176 degrees relative to the second flat segment.

9. The airfoil of claim 6, wherein a hydraulic diameter of the internal cooling passage divided by a characteristic length of both the first pedestal and the second pedestal is less than 1.5.

10. The airfoil claim 6, wherein the first pedestal and the second pedestal are configured to generate a vortex in response to a fluid flowing through a gap disposed between the first pedestal and the second pedestal.

11. The airfoil of claim 6, wherein the first pedestal and the internal cooling passage are configured to generate a vortex in response to a fluid flowing through an outer region defined by the internal cooling passage and the first pedestal.

12. The airfoil of claim 6, wherein the first pedestal and the second pedestal are canted towards an interior portion of the internal cooling passage to form a third chevron geometry.

13. A cast core, comprising:
- a cooling passage at least partially defined by a first wall and a second wall;
- a first pedestal extending from the first wall to the second wall, the first pedestal comprising a first chevron geometry;
- a second pedestal extending from the first wall to the second wall, the second pedestal comprising a second chevron geometry, wherein a gap is defined by the first pedestal and the second pedestal with the gap oriented between the first pedestal and the second pedestal, wherein the first pedestal is oriented at an angle ranging from 140 degrees to 176 degrees relative to the second pedestal and comprises:
- a base disposed at the first wall of the cooling passage;
- a first flat segment extending from the base;
- a curved segment extending from the first flat segment; and
- a second flat segment extending from the curved segment.

14. The cast core of claim 13, wherein:
the first flat segment is oriented at an angle ranging from 5 degrees to 25 degrees relative to a line normal to a flow path.

15. The cast core of claim 13, wherein the first pedestal is canted relative to the second pedestal to form a third chevron geometry.

* * * * *